(12) United States Patent
Ivkovic et al.

(10) Patent No.: US 8,667,039 B2
(45) Date of Patent: Mar. 4, 2014

(54) SYSTEMS AND METHODS FOR VARIANCE DEPENDENT NORMALIZATION FOR BRANCH METRIC CALCULATION

(75) Inventors: Milos Ivkovic, Sunnyvale, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 578 days.

(21) Appl. No.: 12/947,947

(22) Filed: Nov. 17, 2010

(65) Prior Publication Data

US 2012/0124118 A1    May 17, 2012

(51) Int. Cl.
*G06F 17/10*    (2006.01)

(52) U.S. Cl.
USPC .......................................... 708/322; 708/300

(58) Field of Classification Search
None
See application file for complete search history.

(56) References Cited

U.S. PATENT DOCUMENTS

| | | | |
|---|---|---|---|
| 4,243,935 A * | 1/1981 | McCool et al. ............ 324/76.35 |
| 4,791,390 A * | 12/1988 | Harris et al. .................. 333/166 |
| 5,278,846 A | 1/1994 | Okayama et al. |
| 5,317,472 A | 5/1994 | Schweitzer, III |
| 5,325,402 A | 6/1994 | Ushirokawa |
| 5,392,299 A | 2/1995 | Rhines et al. |
| 5,471,500 A | 11/1995 | Blaker et al. |
| 5,513,192 A | 4/1996 | Janku et al. |
| 5,550,870 A | 8/1996 | Blaker et al. |
| 5,612,964 A | 3/1997 | Haraszti |
| 5,701,314 A | 12/1997 | Armstrong et al. |
| 5,710,784 A | 1/1998 | Kindred et al. |
| 5,712,861 A | 1/1998 | Inoue et al. |
| 5,717,706 A | 2/1998 | Ikeda |
| 5,802,118 A | 9/1998 | Bliss et al. |
| 5,844,945 A | 12/1998 | Nam et al. |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | McCallister et al. |
| 6,023,783 A | 2/2000 | Divsalar et al. |
| 6,029,264 A | 2/2000 | Kobayashi et al. |
| 6,041,432 A | 3/2000 | Ikeda |
| 6,065,149 A | 5/2000 | Yamanaka |

(Continued)

FOREIGN PATENT DOCUMENTS

| EP | 0522578 | 1/1993 |
|---|---|---|
| EP | 1814108 | 8/2007 |

(Continued)

OTHER PUBLICATIONS

U.S. Appl. No. 11/461,026, filed Jul. 31, 2006, Tan, Weijun.

(Continued)

*Primary Examiner* — Michael D Yaary
(74) *Attorney, Agent, or Firm* — Hamilton DeSanctis & Cha

(57) ABSTRACT

Various embodiments of the present invention provide systems and methods for data processing. As an example, a data processing circuit is disclosed that includes: a noise predictive filter circuit, a scaling factor adaptation circuit, and a scaling factor application circuit. The noise predictive filter circuit is operable to perform a noise predictive filtering process on a data input based on a filter tap to yield a noise filtered output. The scaling factor adaptation circuit is operable to calculate a scaling factor based at least in part on a derivative of the noise filtered output. The scaling factor application circuit is operable to apply the scaling factor to scale the noise filtered output.

20 Claims, 6 Drawing Sheets

(56) References Cited

U.S. PATENT DOCUMENTS

| | | |
|---|---|---|
| 6,097,764 A | 8/2000 | McCallister et al. |
| 6,145,110 A | 11/2000 | Khayrallah |
| 6,216,249 B1 | 4/2001 | Bliss et al. |
| 6,216,251 B1 | 4/2001 | McGinn |
| 6,229,467 B1 | 5/2001 | Eklund et al. |
| 6,266,795 B1 | 7/2001 | Wei |
| 6,317,472 B1 | 11/2001 | Choi et al. |
| 6,351,832 B1 | 2/2002 | Wei |
| 6,377,610 B1 | 4/2002 | Hagenauer et al. |
| 6,381,726 B1 | 4/2002 | Weng |
| 6,438,717 B1 | 8/2002 | Butler et al. |
| 6,473,878 B1 | 10/2002 | Wei |
| 6,476,989 B1 | 11/2002 | Chainer et al. |
| 6,625,775 B1 | 9/2003 | Kim |
| 6,657,803 B1 | 12/2003 | Ling et al. |
| 6,671,404 B1 | 12/2003 | Kawatani et al. |
| 6,748,034 B2 | 6/2004 | Hattori et al. |
| 6,757,862 B1 | 6/2004 | Marianetti |
| 6,785,863 B2 | 8/2004 | Blankenship et al. |
| 6,788,654 B1 | 9/2004 | Hashimoto et al. |
| 6,810,502 B2 | 10/2004 | Eidson |
| 6,980,382 B2 | 12/2005 | Hirano et al. |
| 6,986,098 B2 | 1/2006 | Poeppelman |
| 7,010,051 B2 | 3/2006 | Murayama et al. |
| 7,047,474 B2 | 5/2006 | Rhee et al. |
| 7,058,873 B2 | 6/2006 | Song et al. |
| 7,073,118 B2 | 7/2006 | Greenberg et al. |
| 7,093,179 B2 | 8/2006 | Shea |
| 7,113,356 B1 | 9/2006 | Wu |
| 7,173,783 B1 | 2/2007 | McEwen et al. |
| 7,184,486 B1 | 2/2007 | Wu et al. |
| 7,191,378 B2 | 3/2007 | Eroz et al. |
| 7,203,015 B2 | 4/2007 | Sakai et al. |
| 7,203,887 B2 | 4/2007 | Eroz et al. |
| 7,236,757 B2 | 6/2007 | Raghavan et al. |
| 7,257,764 B2 | 8/2007 | Suzuki et al. |
| 7,310,768 B2 | 12/2007 | Eidson et al. |
| 7,313,750 B1 | 12/2007 | Feng et al. |
| 7,370,258 B2 | 5/2008 | Iancu et al. |
| 7,403,752 B2 | 7/2008 | Raghavan et al. |
| 7,430,256 B2 | 9/2008 | Zhidkov |
| 7,502,189 B2 | 3/2009 | Sawaguchi et al. |
| 7,505,537 B1 | 3/2009 | Sutardja |
| 7,523,375 B2 | 4/2009 | Spencer |
| 7,587,657 B2 | 9/2009 | Haratsch |
| 7,590,168 B2 | 9/2009 | Raghavan et al. |
| 7,702,989 B2 | 4/2010 | Graef et al. |
| 7,712,008 B2 | 5/2010 | Song et al. |
| 7,801,200 B2 | 9/2010 | Tan |
| 7,802,163 B2 | 9/2010 | Tan |
| 2003/0063405 A1 | 4/2003 | Jin et al. |
| 2003/0081693 A1 | 5/2003 | Raghavan et al. |
| 2003/0087634 A1 | 5/2003 | Raghavan et al. |
| 2003/0112896 A1 | 6/2003 | Raghavan et al. |
| 2003/0134607 A1 | 7/2003 | Raghavan et al. |
| 2004/0071206 A1 | 4/2004 | Takatsu |
| 2004/0098659 A1 | 5/2004 | Bjerke et al. |
| 2005/0010855 A1 | 1/2005 | Lusky |
| 2005/0111540 A1 | 5/2005 | Modrie et al. |
| 2005/0157780 A1 | 7/2005 | Werner et al. |
| 2005/0195749 A1 | 9/2005 | Elmasry et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0123285 A1 | 6/2006 | De Araujo et al. |
| 2006/0140311 A1 | 6/2006 | Ashley et al. |
| 2006/0168493 A1 | 7/2006 | Song et al. |
| 2006/0195772 A1 | 8/2006 | Graef et al. |
| 2006/0248435 A1 | 11/2006 | Haratsch |
| 2006/0256670 A1 | 11/2006 | Park et al. |
| 2007/0011569 A1 | 1/2007 | Casado et al. |
| 2007/0047635 A1 | 3/2007 | Stojanovic et al. |
| 2007/0110200 A1 | 5/2007 | Mergen et al. |
| 2007/0230407 A1 | 10/2007 | Petrie et al. |
| 2007/0286270 A1 | 12/2007 | Huang et al. |
| 2008/0049825 A1 | 2/2008 | Chen et al. |
| 2008/0055122 A1 | 3/2008 | Tan |
| 2008/0065970 A1 | 3/2008 | Tan |
| 2008/0069373 A1 | 3/2008 | Jiang et al. |
| 2008/0168330 A1 | 7/2008 | Graef et al. |
| 2008/0182542 A1* | 7/2008 | Choi et al. .............. 455/296 |
| 2009/0199071 A1 | 8/2009 | Graef |
| 2009/0235116 A1 | 9/2009 | Tan et al. |
| 2009/0235146 A1 | 9/2009 | Tan |
| 2009/0259915 A1 | 10/2009 | Livshitz et al. |
| 2009/0273492 A1 | 11/2009 | Yang et al. |
| 2009/0274247 A1 | 11/2009 | Galbraith et al. |
| 2010/0002795 A1 | 1/2010 | Raghavan et al. |
| 2010/0061492 A1 | 3/2010 | Noeldner |
| 2010/0070837 A1 | 3/2010 | Xu et al. |
| 2010/0164764 A1 | 7/2010 | Nayak |
| 2010/0185914 A1 | 7/2010 | Tan et al. |

FOREIGN PATENT DOCUMENTS

| | | |
|---|---|---|
| WO | WO 2006/016751 | 2/2006 |
| WO | WO 2006/134527 | 12/2006 |
| WO | WO 2007/091797 | 8/2007 |

OTHER PUBLICATIONS

U.S. Appl. No. 11/461,198, filed Jul. 31, 2006, Tan, Weijun.
U.S. Appl. No. 11/461,283 filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2101, Liu, et al.
U.S. Appl. No. 12/887,330, filed Sep. 21, 2010, Zhang, et al.
U.S. Appl. No. 12/887,369, filed Sep. 21, 2010, Liu et al.
U.S. Appl. No. 12/901,816, filed Oct. 11, 2010, Li et al.
U.S. Appl. No. 12/917,756, filed Nov. 2, 2010, Miladinovic et al.
U.S. Appl. No. 12/947,931, filed Nov. 17, 2010, Yang, Shaohua.
U.S. Appl. No. 12/972,942, filed Dec. 20, 2010, Liao et al.
Casado et al., Multiple-rate low-denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding" [online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gunnam, K et al. "Tech. Note on Iterative LDPC Solutions for Turbo Equal.", K. Gunnam, G. Choi and M. Yeary, TX A&M Tech. Note, Rpt. Dt: Jul. 2006 Avail. online dropzone.tamu.edu.
K. Gunnam et al., "Next Generation iterative LDPC solutions for magnetic recording storage," invited paper. The Asilomar Conference on Signals, Systems, and Computers, Nov. 2008.
Han and Ryan, "Pinning Techniques for Low-Floor Detection/Decoding of LDPC-Coded Partial Response Channels", 5th International Symposium on Turbo Codes &Related Topics, 2008.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Mohsenin et al., "Split Row: A Reduced Complexity, High Throughput LDPC Decoder Architecture", pp. 1-6, printed from www.ece.ucdavis.edu on Jul. 9, 2007.
Sari H et al., "Transmission Techniques for Digital Terrestrial TV Broadcasting" IEEE Communications Magazine, IEEE Service Center Ny, NY vol. 33, No. 2 Feb. 1995.
Unk, "Auto threshold and Auto Local Threshold" [online] [retr. May 28, 2010] Retr. from the Internet www.dentristy.bham.ac.uk/landinig/software/autothreshold/autothreshold.html.
Vasic, B., "High-Rate Low-Density Parity-Check Codes Based on Anti-Pasch Affine Geometries," Proc ICC 2002, pp. 1332-1336.

(56) References Cited

OTHER PUBLICATIONS

Vasic, B., "High-Rate Girth-Eight Codes on Rectangular Integer Lattices", IEEE Trans. Communications, vol. 52, Aug. 2004, pp. 1248-1252.

Wang Y et al., "A Soft Decision Decoding Scheme for Wireless COFDM With App. to DVB-T" IEEE Transactions on Consumer elect., IEEE Service Center, NY,NY vo. 50, No. 1 Feb. 2004.

Weon-Cheol L. et al., "Vitierbi Decoding Method Using Channel State Information in COFDM System" IEEE Trans. on Consumer Elect., IEEE Service Center, NY, NY vol. 45 No. 3 Aug. 1999.

Yeo et al., "VLSI Architecture for Iterative Decoders in Magnetic Storage Channels", Mar. 2001, pp. 748-755, IEEE trans. Magnetics, vol. 37, No. 2.

Youn, "BER Perf. Due to Irreg. of Row-Weoght Distr. of the Parity-Check Matirx in Irregular LDPC Codes for 10-Gb/s Optical Signals" Journal of Lightwave Tech., vol. 23 Sep. 9, 2005.

Zhong et al., "Area-Efficient Min-Sum Decoder VLSI Architecture for High-Rate QC-LDPC Codes in Magnetic Recording", pp. 1-15, Submitted 2006, not yet published.

Zhong, "Block-LDPC: A Practical LDPC Coding System Design Approach", IEEE Trans. on Circuits, Regular Papers, vol. 5, No. 4, pp. 766-775, Apr. 2005.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong et al., "Iterative MAX-LOG-MAP and LDPC Detector/Decoder Hardware Implementation for Magnetic Read Channel", SRC Techron, pp. 1-4, Oct. 2005.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.

Zhong, "VLSI Architecture of LDPC Based Signal Detection and Coding System for Magnetic Recording Channel", Thesis, RPI, Troy, NY, pp. 1-95, May 2006.

\* cited by examiner

SYSTEMS AND METHODS FOR VARIANCE DEPENDENT NORMALIZATION FOR BRANCH METRIC CALCULATION

BACKGROUND OF THE INVENTION

The present inventions are related to systems and methods for detecting and/or decoding information, and more particularly to systems and methods for performing variance dependent branch metric calculation.

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by any data losses caused by various factors. In some cases, an encoding/decoding process is used to enhance the ability to detect a data error and to correct such data errors. As an example, a simple data detection and decode may be performed, however, such a simple process often lacks the capability to converge on a corrected data stream.

To heighten the possibility of convergence, various existing processes utilize two or more detection and decode iterations. Turning to FIG. 1, an exemplary prior art two stage data detection and decode circuit 100 is depicted. Two stage data detection and decode circuit 100 receives a data input 105 that is applied to a detector 110. A hard and soft output from detector 110 is provided to a Low Density Parity Check decoder ("an LDPC decoder") 115. Input 105 is fed forward via a buffer 130 to another detector 120. Detector 120 uses a soft output of LDPC decoder 115 and input 105 to perform an additional data detection process. A hard and soft output from detector 120 is provided to an LDPC decoder 125 that performs a second decoding process and provides an output 135. Where the initial detection and decode provided by detector 110 and LDPC decoder 115 does not converge, the subsequent detection and decode provided by detector 120 and LDPC decoder 125 provide an additional opportunity to converge. The aforementioned approach is used for targets with different energy. This can lead to, for example, large fixed point loss that corresponds to lost information due to rounding when a low energy target is involved. Such losses undermine any possibility of conversion.

Hence, for at least the aforementioned reasons, there exists a need in the art for advanced systems and methods for data processing.

BRIEF SUMMARY OF THE INVENTION

The present inventions are related to systems and methods for detecting and/or decoding information, and more particularly to systems and methods for performing variance dependent branch metric calculation.

Various embodiments of the present invention provide data processing circuits that include: a noise predictive filter circuit, a scaling factor adaptation circuit, and a scaling factor application circuit. The noise predictive filter circuit is operable to perform a noise predictive filtering process on a data input based on a filter tap to yield a noise filtered output. The scaling factor adaptation circuit is operable to calculate a scaling factor based at least in part on a derivative of the noise filtered output. The scaling factor application circuit is operable to apply the scaling factor to scale the noise filtered output.

In some instances of the aforementioned embodiments, the scaling factor adaptation circuit includes a multiplier circuit operable to multiply the noise filtered output by the scaling factor to yield a scaled noise filtered output. In particular instances of the aforementioned embodiments, the scaling factor adaptation circuit is operable to calculate a variance in the derivative of the noise filtered output to yield a calculated variance, and to calculate the scaling factor based upon a ratio of the calculated variance and a desired variance. In some cases, the scaling factor adaptation circuit calculates the scaling factor in accordance with the following equation:

$$\text{Scaling Factor} = \sqrt{\frac{\text{Desired Variance}}{\text{Calculated Variance}}}.$$

In other instances of the aforementioned embodiments, the scaling factor adaptation circuit includes a multiplier circuit operable to multiply an unscaled filter tap by the scaling factor to yield the filter tap. In some such instances, the scaling factor adaptation circuit is operable to calculate a variance in the derivative of the noise filtered output to yield a calculated variance, and to receive a desired variance.

In various instances of the aforementioned embodiments, the circuit further includes an edge mean calculation circuit and a summation circuit. The edge mean calculation circuit is operable to calculate an edge mean value based on the derivative of the noise filtered output. The summation circuit operable to sum a derivative of the edge mean value with the noise filtered output to yield the derivative of the noise filtered output. In some cases, the edge mean calculation circuit includes a multiplier circuit operable to multiply the edge mean value by the scaling factor to yield the derivative of the edge mean value.

Some embodiments of the present invention provide methods for variance dependent data normalization. The methods include: performing a noise predictive filtering on a data input based on a filter tap to yield a noise filtered output; calculating a variance of a derivative of the noise filtered output to yield a calculated variance; calculating a scaling factor using the calculated variance and a desired variance; and applying the scaling factor to scale the noise filtered output. In some cases, applying the scaling factor includes multiplying an unscaled filter tap by the scaling factor to yield the filter tap. In other cases, applying the scaling factor includes multiplying the noise filtered output by the scaling factor to yield a scaled noise filtered output.

Yet other embodiments of the present invention provide data storage devices that include: a storage medium, an analog front end circuit, and a data processing circuit. The storage medium maintains a representation of an input data set, and the analog front end circuit is operable to sense the representation of the input data set and to provide the input data set as a data input. The data processing circuit includes: a noise predictive filter circuit, a scaling factor adaptation circuit, and a scaling factor application circuit. The noise predictive filter circuit is operable to perform a noise predictive filtering process on a data input based on a filter tap to yield a noise filtered output. The scaling factor adaptation circuit is operable to calculate a scaling factor based at least in part on a derivative of the noise filtered output. The scaling factor application circuit is operable to apply the scaling factor to scale the noise filtered output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for detecting and/or decoding information, and more particularly to systems and methods for performing variance dependent branch metric calculation.

Figure 1:
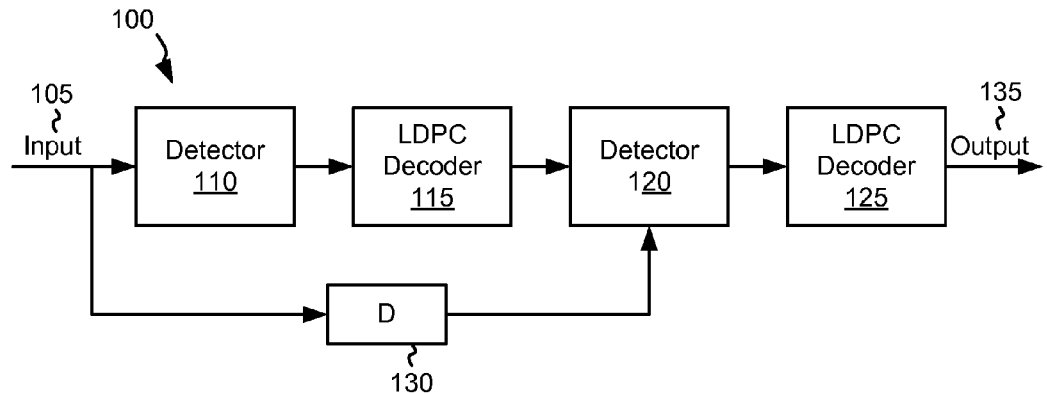
FIG. 1 depicts a prior art two stage data detection and decoding system.
Figure 2:
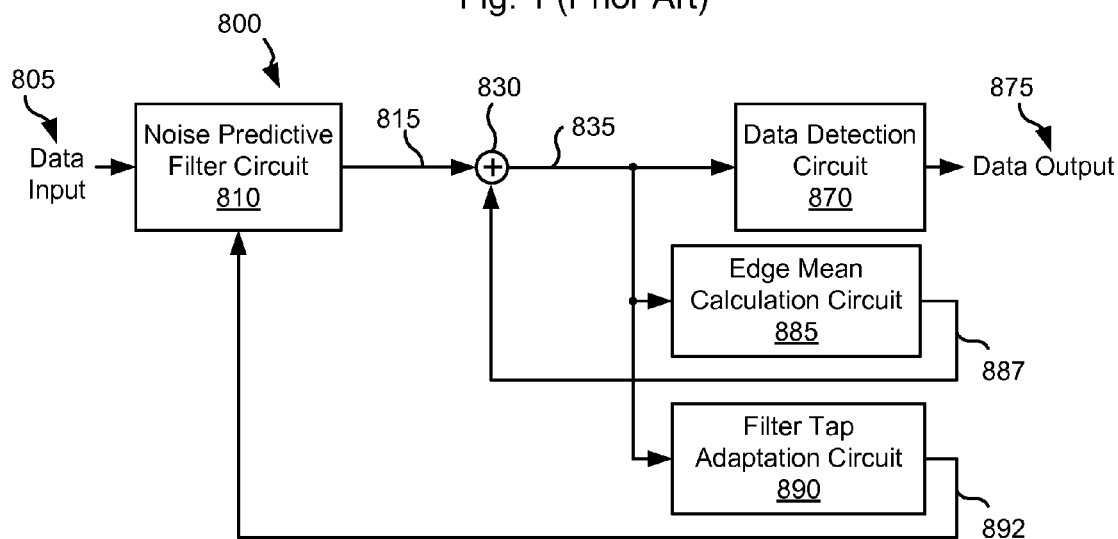
FIG. 2 depicts a prior art data detection circuit.

FIG. 2 shows a prior art data detector circuit 800 that may be used in place of the data detector circuits of the detection and decoding system of FIG. 1. Data detector circuit 800 includes a noise predictive filter circuit 810 that receives a data input 805 and performs a noise predictive filtering based upon filter taps 892 to yield a noise whitened output 815. An edge mean value 887 is subtracted from noise whitened output 815 to yield a noise output 835. Noise output 835 is provided to a data detection circuit 870 where it is used to determine a data output 875.

Data detector circuit 800 includes an edge mean calculation circuit 885 and a filter tap adaptation circuit 890. Filter tap adaptation circuit 890 adjusts filter taps 892 provided back to noise predictive filter circuit 810 based upon noise output 835. Edge mean value calculation circuit 885 calculates a condition (i.e., cond) based edge mean value 887 that is provided to a summation circuit 830.

Data detector circuit 800 utilizes a calculated branch metric to determine a most likely value for a given bit position based upon previous conditions (i.e., cond). Where a Gaussian distribution is assumed, the following equation holds:

$$-\ln\left(\prod_{i=0}^{n-1} \frac{e^{\frac{-(z(cond)-edgeMean(cond))^2}{2\sigma(cond)^2}}}{\sqrt{2\pi\sigma(cond)^2}}\right) =$$

$$\sum_{i=0}^{n-1}\left(\frac{(z(cond)-edgeMean(cond))^2}{2\sigma(cond)^2} + \frac{1}{2}\ln(2\pi) + \ln(\sigma(cond))\right),$$

where cond indicates a particular bit pattern, $\sigma(cond)^2$ is a variance of the received samples when cond is written, edgeMean(cond) is a value of the noiseless output of a noise predictive filter corresponding to the bit pattern cond, and z(cond) is an equalized sample of the received bit pattern cond.

For fixed point data detector circuit implementations, the $$\frac{1}{2}\ln(2\pi)$$

term may be dropped, and the entire equation multiplied by $2\sigma(cond)^2$ and divided by a fixed term (fixed) yielding the following equation:

$$sqnoise = \frac{(z(cond)-edgeMean(cond))^2}{fixed} - \beta\ln(s(cond)),$$

where $$\beta = \frac{2\sigma(cond)^2}{fixed}, \text{ and } s(cond) = \frac{\sigma(cond_0)}{\sigma(cond)}.$$

Said another way, the output of noise predictive filter 810 output is scaled by an s(cond) term so that the variance of all bit patterns (cond) is normalized to the variance of a fixed bit pattern ($cond_0$). In some cases, the fixed bit pattern is selected as a zero bit pattern or a Nyquist bit pattern.

The aforementioned approach results in large fixed point losses when low energy targets (e.g., [6 12]) convolved with noise predictive finite impulse response filter taps yield edge mean values in a numeric range. When the edge mean values are divided by the fixed value suitable for higher energy targets (e.g., [8 14]), smaller numeric values for the aforementioned sqnoise term are achieved. Such smaller numeric values yield smaller variance. However, the division by the fixed term results in the loss of significant information.

Some embodiments of the present invention operate to mitigate the loss of information available in a data detection process by normalizing the input to a data detector circuit. Such normalization results in similar variance in the input of the detector circuit across different bit patterns and all channel conditions (i.e., signal to noise ratios). Such embodiments may be applied to read channel circuits used in storage device applications, wireless transmission circuit and other applications. The solutions rely on a data detection approach where an input is normalized so that any received samples exhibit a similar variance across bit patterns and channel conditions (e.g., signal to noise ratios). As just one advantage of such an approach, the data detection approach is substantially independent of the energy level of a received input.

Figure 3:
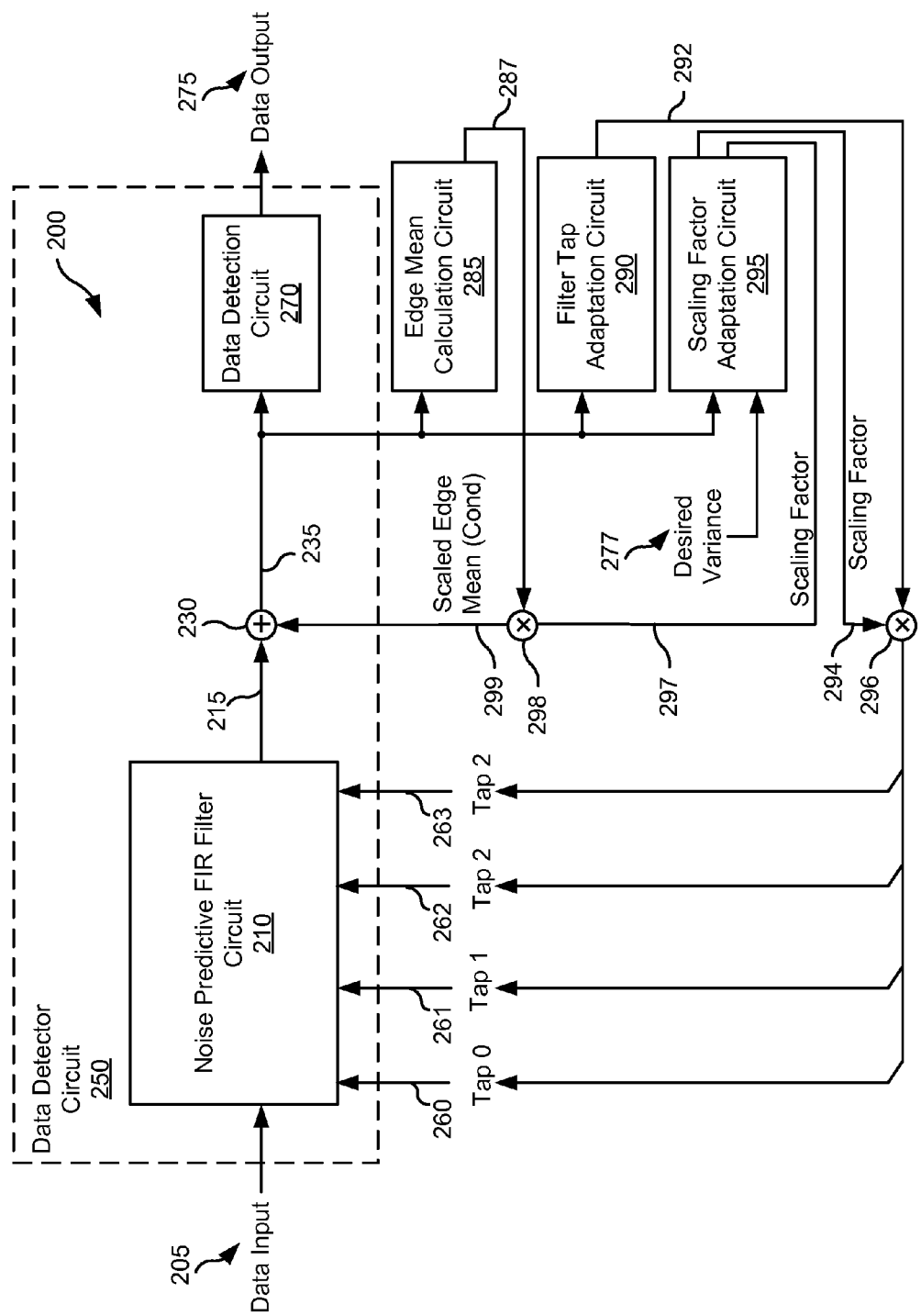
FIG. 3 depicts a variance normalized detection circuit in accordance with some embodiments of the present invention.

Turning to FIG. 3, a variance normalized detection circuit 200 is shown in accordance with some embodiments of the present invention. Variance normalized detection circuit 200 includes a noise predictive finite impulse response filter circuit 210 that receives a data input 205 and performs a noise predictive filtering based upon filter taps 260, 261, 262, 263 to yield a noise whitened output (z(cond)) 215. As more fully discussed below, filter taps 260, 261, 262, 263 are scaled such that noise whitened output 215 has the effect of being scaled. Noise whitened output 215 is provided to a summation circuit 230. Summation circuit 230 subtracts a scaled edge mean value (edgemean(cond)) 299 from noise whitened output 215 to yield a noise output 235 in accordance with the following equation:

noise output=z(cond)−edgeMean(cond).

Again, noise whitened output 215 is indirectly scaled by a scaling factor 294 and scaled edge mean value 299 is an edge mean value 287 that is directly scaled by scaling factor 297. Scaling factor 294 is varied based upon a level of variance in noise output 235 to force the variance in noise output 235 to approach a desired variance 277. In some embodiments, the desired variance is eight. In other embodiments, the desired variance is another power of two. In this way, data losses due to variance in data input 205 are mitigated.

An edge mean calculation circuit 285 receives noise output 235 and calculates edge mean value 287 using an approach known in the art. Edge mean value 287 is provided to a multiplier circuit 298 where it is multiplied by scaling factor 297 to yield scaled edge mean value 299. A filter tap adaptation circuit 290 receives noise output 235 and adaptively calculates pre-scaled filter taps 292 that correspond to filter taps 260, 261, 262, 263. Filter tap adaptation circuit 290 may include, but is not limited to, a least mean squared error generator circuit (not shown) that provides an error output to a loop filter circuit (not shown). It should be noted that the least mean squared error generator circuit is one type of error generator circuit that may be used in relation to different embodiments of the present invention. Based upon the disclosure provided herein, one of ordinary skill in the art will recognize other types of error generator circuits that may be used in relation to different embodiments of the present invention. For example, a zero forcing error generator circuit or a hybrid zero forcing error generator circuit may be used in place of the aforementioned least mean squared error generator circuit. Such filter tap adaptation circuits are known in the art. In particular, filter tap adaptation circuit 290 provides filter taps 292 to a multiplier circuit 296 where each of the respective filter taps 292 are multiplied by a scaling factor 294 to yield filter taps 260, 261, 262, 263. This scaling of filter taps 260, 261, 262, 263 by a scaling factor 294 is designed to yield noise whitened output 215 scaled by the same scaling factor (i.e., scaling factor 297) that was applied to yield scaled edge mean value 299. As such, noise output 235 may be represented as:

noise output=[z(cond)−edgeMean(cond)]*scaling factor 297, where z(cond) and edgeMean(cond) respectively represent the output of noise predictive filter circuit 210 and summation circuit 230 in the absence of any applied scaling factors to either filter taps 260, 261, 262, 263 or edge mean value 287.

Scaling factor adaptation circuit 295 receives noise output 235 and calculates a variance across all outputs. This calculated variance may be computed by setting scaling factor 297 to unity ('1') for both z(cond) and edgeMean(cond) based on the formula described herein. The calculated variance may be compared with a desired variance. Alternatively, scaling factor 297 may be recursively calculated to yield a desired variance 277 in accordance with the following equation:

$$\text{Scaling Factor } 297 = \sqrt{\frac{\text{Desired Variance } 277}{\text{Calculated Variance}}} \text{ (Old Scaling Factor)},$$

where the old scaling factor is the previous value of scaling factor 297. Scaling factor 294 is calculated to yield filter taps 260, 261, 262, 263 that will result in noise whitened output 215 effectively scaled by scaling factor 297.

Noise output 235 is provided to a data detection circuit 270 where it is further massaged to yield a squared noise output suitable for branch metric calculation. In particular, the squared noise output may be represented by the following equation:

$$sqnoise = (\text{noise output } 235)^2 - \beta \ln\left(\frac{\sigma(cond_0)}{\sigma(cond)}\right),$$

where β equals the square of scaling factor 297 multiplied by 2 var to balance the scaling with that applied to the first part of the equation (i.e., (noise output 235)²). Using the branch metrics calculated based on noise output 235, data detection circuit 270 provides a data output 275

During adaptation of filter taps 260, 261, 262, 263, filter tap adaption circuit 290 fixes filter tap 260 at a zero condition, and adapts filter taps 261, 262, 263 using a standard filter tap adaption approach. The adapted filter taps 260, 261, 262, 263 are used by noise predictive finite impulse response circuit 210 to perform noise predictive filtering. The resulting noise whitened output is combined with edge mean value 287 (i.e., scaling factor 297 is set to unity) and a variance of noise output 235 is calculated by scaling factor adaptation circuit 295. This calculated variance is used to calculate scaling factor 297 and scaling factor 294 that will yield desired variance 277. Using the calculated scaling factors, filter tap 260 is allowed to float (i.e., is no longer fixed to the zero condition) and scaled filter taps 260, 261, 262, 263 result in a scaled noise whitened output 215 that provides for uniform variance.

Figure 4:
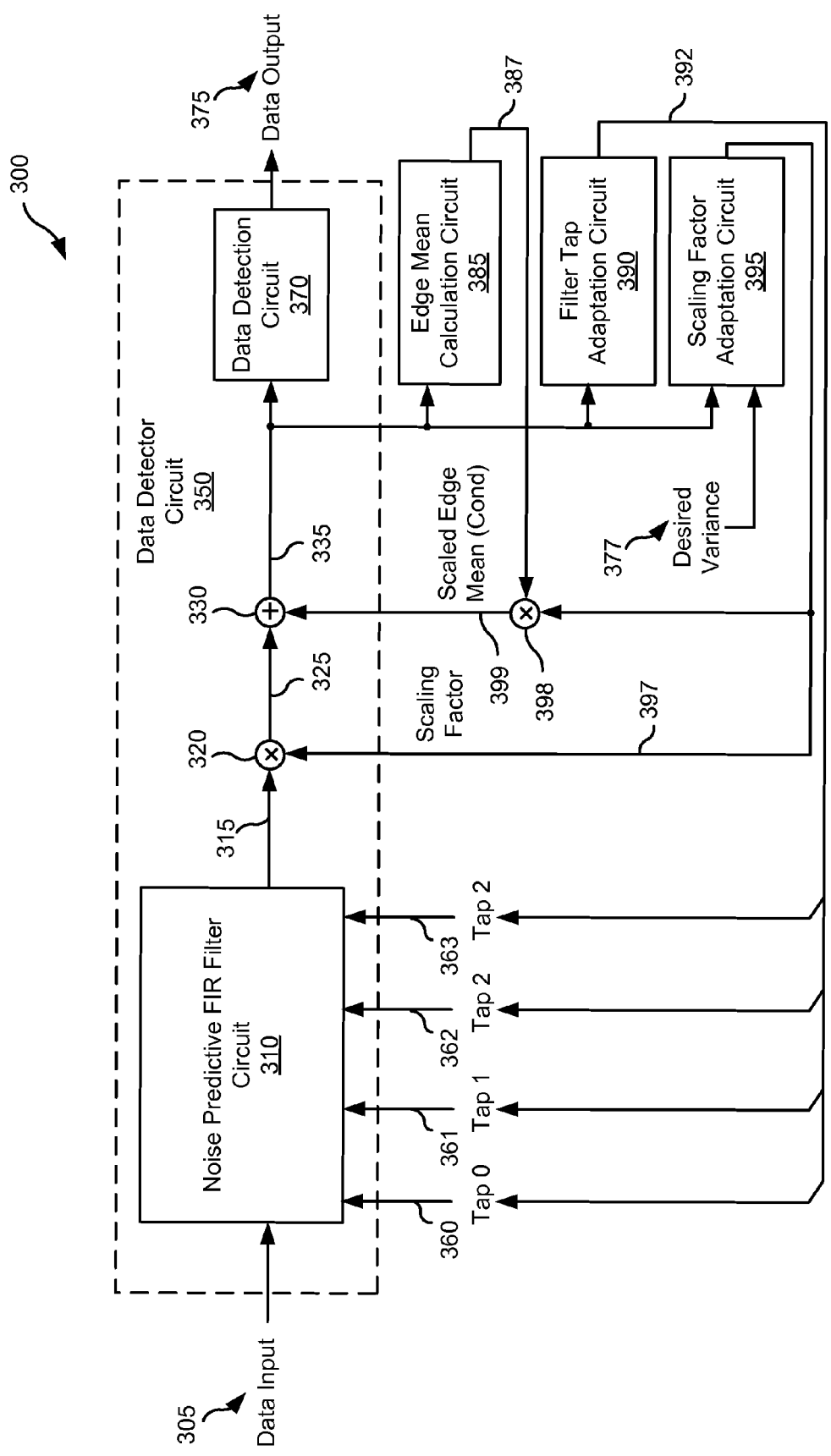
FIG. 4 depicts another variance normalized detection circuit in accordance with other embodiments of the present invention.

Turning to FIG. 4, another variance normalized detection circuit 300 is shown in accordance with other embodiments of the present invention. Variance normalized detection circuit 300 includes a noise predictive finite impulse response filter circuit 310 that receives a data input 305 and performs a noise predictive filtering based upon filter taps 360, 361, 362, 363 to yield a noise whitened output (z(cond)) 315. Noise whitened output 315 is provided to a multiplier circuit 320 where it is multiplied by a scaling factor 397 to yield a scaled output 325. Scaled output 325 is provided to a summation circuit 330. Summation circuit 330 subtracts a scaled edge mean value (edgemean(cond)) 399 from scaled output 325 to yield a scaled noise output 335 in accordance with the following equation:

scaled noise output=[z(cond)−edgeMean(cond)]*scaling factor

Scaling factor 397 is varied based upon a level of variance in scaled noise output 335 to force the variance in scaled noise output 335 to approach a desired variance 377. In some embodiments, the desired variance is eight. In other embodiments, the desired variance is another power of two. In this way, data losses due to variance in data input 305 are mitigated.

An edge mean calculation circuit 385 receives scaled noise output 335 and calculates edge mean value 387 using an approach known in the art. Edge mean value 387 is provided to a multiplier circuit 398 where it is multiplied by scaling factor 397 to yield scaled edge mean value 399. A filter tap adaptation circuit 390 receives scaled noise output 335 and adaptively filter taps 360, 361, 362, 363. Filter tap adaptation circuit 390 may include, but is not limited to, a least mean squared error generator circuit (not shown) that provides an error output to a loop filter circuit (not shown). It should be noted that the least mean squared error generator circuit is one type of error generator circuit that may be used in relation to different embodiments of the present invention. Based upon the disclosure provided herein, one of ordinary skill in the art will recognize other types of error generator circuits that may be used in relation to different embodiments of the present invention. For example, a zero forcing error generator circuit or a hybrid zero forcing error generator circuit may be used in place of the aforementioned least mean squared error generator circuit. Such filter tap adaptation circuits are known in the art. In particular, filter tap adaptation circuit 390 provides filter taps 360, 361, 362, 363 to noise predictive finite impulse response filter circuit 310.

Scaling factor adaptation circuit 395 receives scaled noise output 335 and calculates a variance across all outputs. This calculated variance may be computed by setting scaling factor 297 to unity ('1') for both z(cond) and edgeMean(cond) based on the formula described herein. Alternatively, scaling factor 397 may be recursively calculated to yield a desired variance 377 in accordance with the following equation:

$$\text{Scaling Factor 397} = \sqrt{\frac{\text{Desired Variance 377}}{\text{Calculated Variance}}} \text{ (Old Scaling Factor)},$$

where the old scaling factor is the previous value of scaling factor 397.

Scaled noise output 335 is provided to a data detection circuit 370 where it is further massaged to yield a squared noise output suitable for branch metric calculation. In particular, the squared noise output may be represented by the following equation:

$$sqnoise = (\text{scaled noise output 335})^2 - \beta \ln\left(\frac{\sigma(cond_0)}{\sigma(cond)}\right),$$

where $\beta$ equals the square of scaling factor 397 multiplied by $2\sigma(cond)$ to balance the scaling with that applied to the first part of the equation (i.e., (scaled noise output 335)$^2$). Using the branch metrics calculated based on noise output 335, data detection circuit 370 provides a data output 375.

Figure 5:
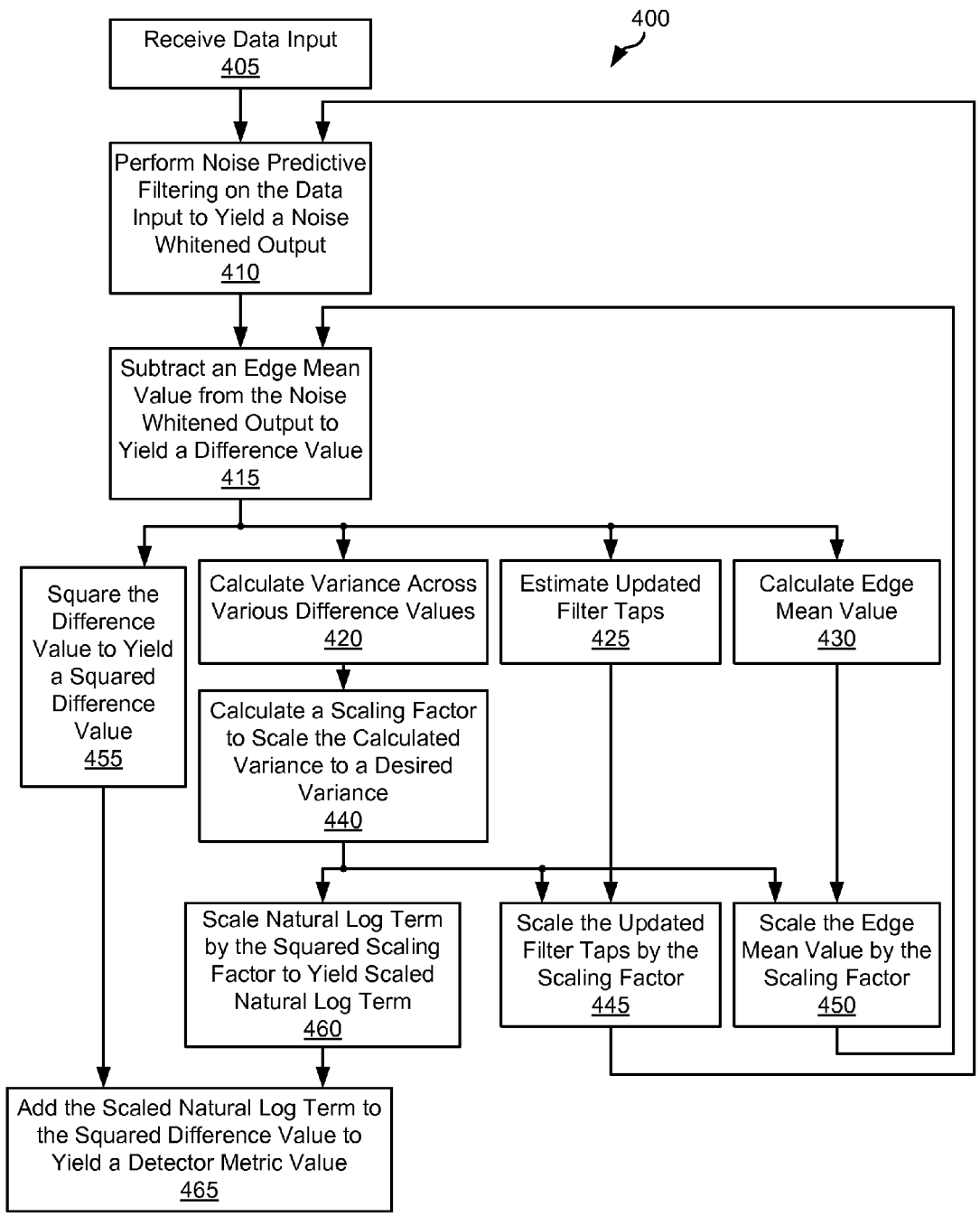
FIG. 5 is a flow diagram showing a method in accordance with one or more embodiments of the present invention for governing the variance at the input of a data detector circuit.

Turning to FIG. 5, a flow diagram 400 shows a method in accordance with one or more embodiments of the present invention for governing the variance at the input of a data detector circuit. Following flow diagram 400, a data input is received (block 405). In some cases, the data input is derived from a storage medium. In other cases, the data input is derived from a transmission medium. Based upon the disclosure provided herein, one of ordinary skill in the art will recognize other sources from which the data input may be derived. Noise predictive filtering is applied to the data input to yield a noise whitened output (block 410). The noise predictive filtering may be done using any noise predictive filtering approach known in the art. The noise predictive filtering is done using filter taps that are adapted and scaled to govern the amount of variance occurring in the noise whitened output.

A scaled edge mean value is subtracted from the noise whitened output (block 415) to yield a difference value in accordance with the following equation:

difference value=z(cond)−edgeMean(cond), where z(cond) is the noise whitened output that is scaled by modification of the filter taps to govern variance, and edgeMean(cond) is the scaled edge mean value. The difference value is squared to yield a squared difference value (block 455) in accordance with the following equation:

(difference value)=(z(cond)−edgeMean(cond))$^2$.

The difference value is also used to calculate a variance (i.e., calculated variance) across a number of difference values (block 420). This variance is compared with a desired variance to calculate a scaling factor (block 440). The scaling factor is calculated to force an output variance to a defined level. As an example, the scaling factor may be calculated in accordance with the following equation:

$$\text{Scaling Factor} = \sqrt{\frac{\text{Desired Variance}}{\text{Calculated Variance}}} \text{ (Old Scaling Factor)},$$

where the old scaling factor is a previous version of the scaling factor. A square of the scaling factor (i.e., (scaling factor)$^2$) is multiplied by $2\sigma(cond)^2$ to yield the multiplication value $\beta$ of a scaled natural log term used in the branch metric calculation to yield the following component (block 460):

$$\beta \ln\left(\frac{\sigma(cond_0)}{\sigma(cond)}\right),$$

again, where $\sigma(cond)$ is a variance of the received samples when cond is written. The scaled natural log term is subtracted from the aforementioned squared difference value to yield a detector metric value (block 465) in accordance with the following equation:

$$\text{detector metric value} = (\text{difference value})^2 - \beta \ln\left(\frac{\sigma(cond_0)}{\sigma(cond)}\right).$$

In addition, the aforementioned difference value (block 415) is used to estimate updated filter taps (i.e., the filter taps for the noise predictive filters) (block 425). The updated filter taps are scaled using the previously calculated scaling factor (block 440) such that the variance in the noise whitened output is forced to the desired variance (block 445). Said another way, the scaled filter taps yield an output from the noise predictive filtering process that may be represented as:

noise whitened output=z(cond)*scaling factor, where z(cond) represent the noise whitened output of noise predictive filter process in the absence of any applied scaling factors to the filter taps. The scaled filter taps are provides as a feedback to the noise predictive filtering process of block 410.

In addition, the aforementioned difference value (block 415) is used to calculate an edge mean value as is known in the art (block 430). This edge mean value is scaled by the previously calculated scaling factor (block 440) to yield a scaled edge mean value (block 450) in accordance with the following equation:

scaled edgemean value=scaling factor*edge mean value.

This scaled edge mean value is used in the summation process of block 415.

Figure 6:
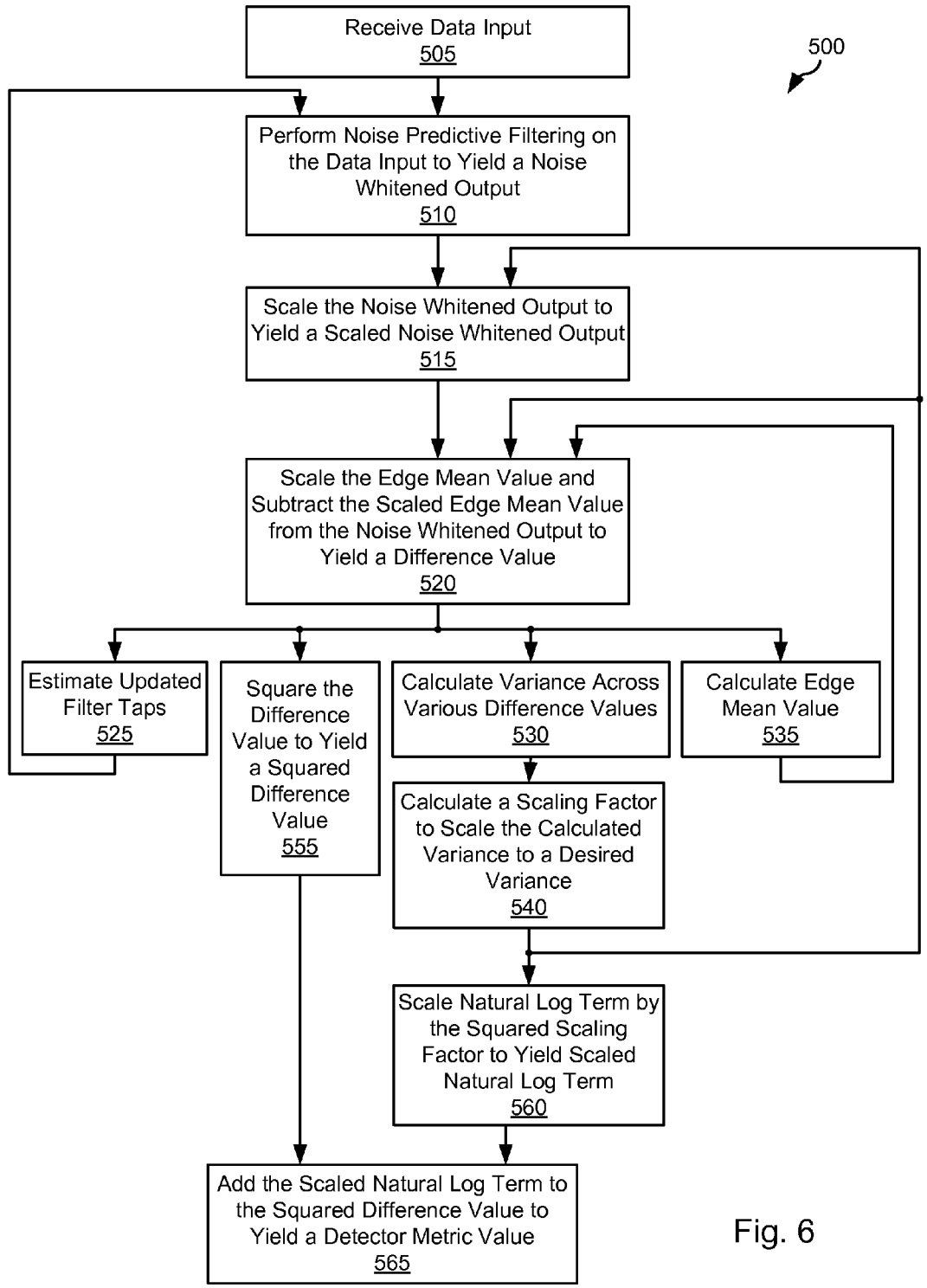
FIG. 6 is a flow diagram showing a method in accordance with various embodiments of the present invention for governing the variance at the input of a data detector circuit.

Turning to FIG. 6, a flow diagram 500 shows a method in accordance with various embodiments of the present invention for governing the variance at the input of a data detector circuit. Following flow diagram 500, a data input is received (block 505). In some cases, the data input is derived from a storage medium. In other cases, the data input is derived from a transmission medium. Based upon the disclosure provided herein, one of ordinary skill in the art will recognize other sources from which the data input may be derived. Noise predictive filtering is applied to the data input to yield a noise whitened output (block 510). The noise predictive filtering may be done using any noise predictive filtering approach known in the art. The noise predictive filtering is done using filter taps that are adapted using an adaptation process known in the art.

The noise whitened output is scaled by a scaling factor to yield a scaled noise whitened output (block 515). This scaling may be done in accordance with the following equation:

scaled noise whitened output=noise whitened output*scaling factor.

An edge mean value is scaled by the same scaling factor to yield a scaled edge mean value, and the scaled edge mean value is subtracted from the scaled noise whitened value to yield a difference value (block 520) in accordance with the following equation:

difference value=[noise whitened output−edge mean value]*scaling factor.

The difference value is squared to yield a squared difference value (block 555) in accordance with the following equation:

(difference value)$^2$=([noise whitened output−edge mean value]*scaling factor)$^2$.

The difference value is also used to calculate a variance (i.e., calculated variance) across a number of difference values (block 530). This variance is compared with a desired variance to calculate a scaling factor (block 540). The scaling factor is calculated to force an output variance to a defined level. As an example, the scaling factor may be calculated in accordance with the following equation:

$$\text{Scaling Factor} = \sqrt{\frac{\text{Desired Variance}}{\text{Calculated Variance}}} \, (\text{Old Scaling Factor}),$$

where the old scaling factor is a previous version of the scaling factor. A square of the scaling factor (i.e., (scaling factor)$^2$) is multiplied by 2σ(cond) to yield the multiplication value β of a scaled natural log term used in the branch metric calculation to yield the following component (block 560):

$$\beta \ln\left(\frac{\sigma(cond_0)}{\sigma(cond)}\right),$$

again, where σ(cond) is a variance of the received samples when cond is written. The scaled natural log term is subtracted from the aforementioned squared difference value to yield a detector metric value (block 565) in accordance with the following equation:

$$\text{detector metric value} = (\text{difference value})^2 - \beta \ln\left(\frac{\sigma(cond_0)}{\sigma(cond)}\right).$$

In addition, the aforementioned difference value (block 520) is used to estimate updated filter taps (i.e., the filter taps for the noise predictive filters) (block 525). The updated filter taps are provided to use in relation to the noise predictive filtering process. In addition, the an edge mean value is calculated based upon the difference value (block 535). This edge mean value is provided to the edge mean scaling process (block 520).

Figure 7:
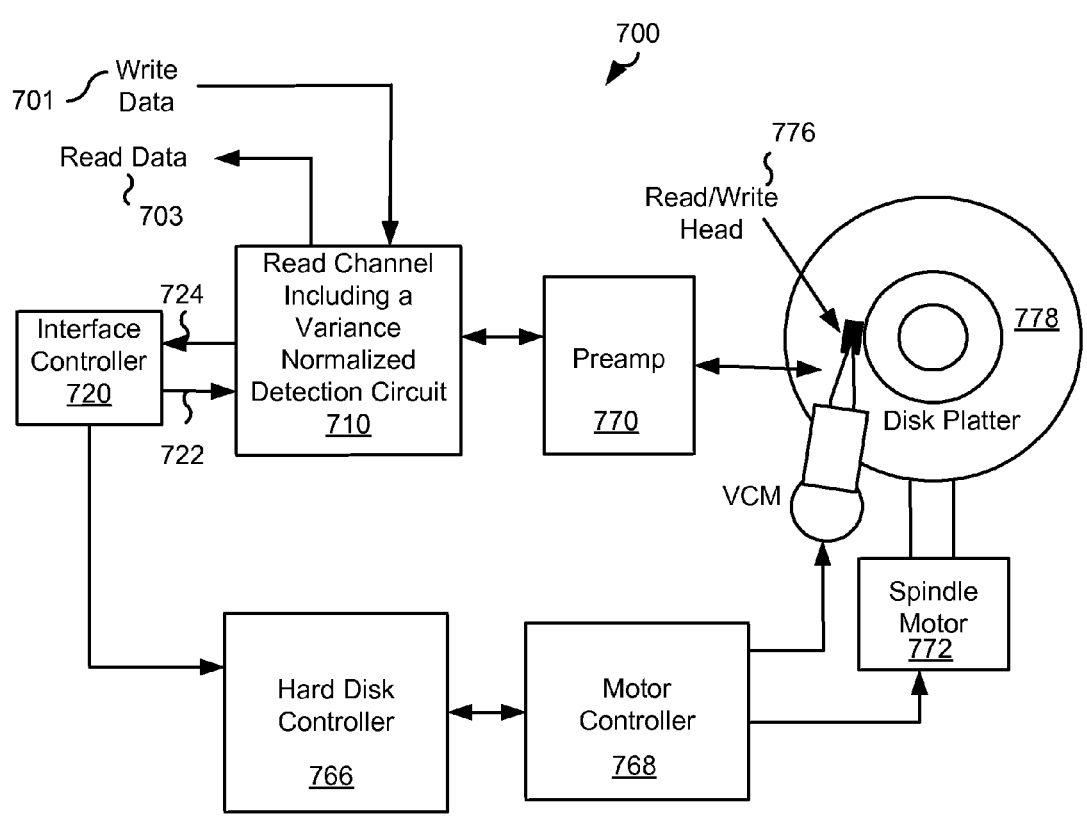
FIG. 7 shows a storage system including a variance normalized detection circuit in accordance with various embodiments of the present invention.

Turning to FIG. 7, a storage system 700 including read channel 710 including a variance normalized detection circuit in accordance with different embodiments of the present invention. Storage system 700 may be, for example, a hard disk drive. Read channel 710 may include, but is not limited to, a variance normalized detection circuit that may be implemented similar to that discussed above in relation to one or both of FIG. 3 and FIG. 4. In some cases, the variance normalized detection circuit may operate similar to that described in relation to one of FIG. 5 or FIG. 6.

Storage system 700 also includes a preamplifier 770, an interface controller 720, a hard disk controller 766, a motor controller 768, a spindle motor 772, a disk platter 778, and a read/write head assembly 776. Interface controller 720 controls addressing and timing of data to/from disk platter 778. The data on disk platter 778 consists of groups of magnetic signals that may be detected by read/write head assembly 776 when the assembly is properly positioned over disk platter 778. In one embodiment, disk platter 778 includes magnetic signals recorded in accordance with a perpendicular recording scheme. For example, the magnetic signals may be recorded as either longitudinal or perpendicular recorded signals.

In a typical read operation, read/write head assembly 776 is accurately positioned by motor controller 768 over a desired data track on disk platter 778. The appropriate data track is defined by an address received via interface controller 720. Motor controller 768 both positions read/write head assembly 776 in relation to disk platter 778 and drives spindle motor 772 by moving read/write head assembly to the proper data track on disk platter 778 under the direction of hard disk controller 766. Spindle motor 772 spins disk platter 778 at a determined spin rate (RPMs). Once read/write head assembly 778 is positioned adjacent the proper data track, magnetic signals representing data on disk platter 778 are sensed by read/write head assembly 776 as disk platter 778 is rotated by spindle motor 772. The sensed magnetic signals are provided as a continuous, minute analog signal representative of the magnetic data on disk platter 778. This minute analog signal is transferred from read/write head assembly 776 to read channel 710 via preamplifier 770. Preamplifier 770 is operable to amplify the minute analog signals accessed from disk platter 778. In turn, read channel module 710 decodes and digitizes the received analog signal to recreate the information originally written to disk platter 778. The decoding process may utilize local iterative loops where the output of the decoder circuit is dynamically scaled and provided as an input to the decoder circuit. This input is decoded again. The read data is provided as read data 703. A write operation is substantially the opposite of the preceding read operation with write data 701 being provided to read channel module 710. This data is then encoded and written to disk platter 778.

Figure 8:
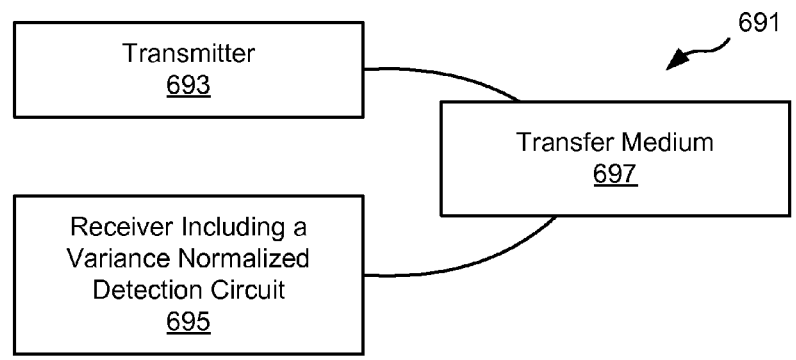
FIG. 8 depicts a communication system including a variance normalized detection circuit in accordance with different embodiments of the present invention.

Turning to FIG. 8, a communication system 691 including a receiver 695 having a variance normalized detection circuit in accordance with different embodiments of the present invention. Communication system 691 includes a transmitter 693 that is operable to transmit encoded information via a transfer medium 697 as is known in the art. The encoded data is received from transfer medium 697 by receiver 695. Receiver 695 incorporates a variance normalized detection circuit. The incorporated variance normalized detection circuit is capable of maintaining a variance at the input of a detection circuit at a defined level. Such a variance governing circuit may be implemented similar to that discussed above in relation to one or both of FIG. 3 and FIG. 4. The approach for governing variance may be implemented using one of the methods discussed above in relation to one or both of the flow diagrams of FIG. 5 and FIG. 6. Based on the disclosure provided herein, one of ordinary skill in the art will recognize a variety of mediums over which data may be transferred.

In conclusion, the invention provides novel systems, devices, methods and arrangements for performing data decoding and/or detection. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscribe line systems. Therefore, the above description should not be taken as limiting the scope of the invention, which is defined by the appended claims.

What is claimed is:

1. A data processing circuit, the circuit comprising:
a noise predictive filter circuit operable to perform a noise predictive filtering process on a data input based on a filter tap to yield a noise filtered output;
a scaling factor adaptation circuit operable to calculate a scaling factor based at least in part on a derivative of the noise filtered output;
a scaling factor application circuit operable to apply the scaling factor to scale the noise filtered output;
an edge mean calculation circuit operable to calculate an edge mean value based on the derivative of the noise filtered output; and
a summation circuit operable to sum a derivative of the edge mean value with the noise filtered output to yield the derivative of the noise filtered output.

2. The circuit of claim 1, wherein the scaling factor adaptation circuit includes a multiplier circuit operable to multiply the noise filtered output by the scaling factor to yield a scaled noise filtered output.

3. The circuit of claim 2, wherein the scaling factor adaptation circuit is operable to calculate a variance in the derivative of the noise filtered output to yield a calculated variance, and to calculate the scaling factor based upon a ratio of the calculated variance and a desired variance.

4. The circuit of claim 3, wherein the scaling factor adaptation circuit calculates the scaling factor in accordance with the following equation:

$$\text{Scaling Factor} = \sqrt{\frac{\text{Desired Variance}}{\text{Calculated Variance}}}.$$

5. The circuit of claim 1, wherein the scaling factor adaptation circuit includes a multiplier circuit operable to multiply an unscaled filter tap by the scaling factor to yield the filter tap.

6. The circuit of claim 5, wherein the scaling factor adaptation circuit is operable to calculate a variance in the derivative of the noise filtered output to yield a calculated variance, and to receive a desired variance.

7. The circuit of claim 1, wherein the noise predictive filter is a finite impulse response filter.

8. The circuit of claim 1, wherein the circuit further comprises:
a data detector circuit operable to apply a data detection algorithm to the derivative of the noise filtered output.

9. The circuit of claim 1, wherein the edge mean calculation circuit includes a multiplier circuit operable to multiply the edge mean value by the scaling factor to yield the derivative of the edge mean value.

10. The circuit of claim 1, wherein the circuit is implemented as part of an integrated circuit.

11. The circuit of claim 1, wherein the circuit is implemented as part of a device selected from a group consisting of: a storage device and a wireless communication device.

12. A method for variance dependent data normalization, the method comprising:
performing a noise predictive filtering on a data input based on a filter tap to yield a noise filtered output;
calculating a variance of a derivative of the noise filtered output to yield a calculated variance;
calculating a scaling factor using the calculated variance and a desired variance; and
applying the scaling factor to scale the noise filtered output.

13. The method of claim 12, wherein applying the scaling factor includes multiplying an unscaled filter tap by the scaling factor to yield the filter tap.

14. The method of claim 12, wherein applying the scaling factor includes multiplying the noise filtered output by the scaling factor to yield a scaled noise filtered output.

15. The method of claim 14, wherein the scaling factor is defined by the following equation:

$$\text{Scaling Factor} = \sqrt{\frac{\text{Desired Variance}}{\text{Calculated Variance}}}.$$

16. A data storage device, the storage device comprising:
a storage medium maintaining a representation of an input data set;
an analog front end circuit operable to sense the representation of the input data set and to provide the input data set as a data input; and
a data processing circuit including:
a noise predictive filter circuit operable to perform a noise predictive filtering process on the data input based on a filter tap to yield a noise filtered output;
a scaling factor adaptation circuit operable to calculate a scaling factor based at least in part on a derivative of the noise filtered output; and
a scaling factor application circuit operable to apply the scaling factor to scale the noise filtered output, wherein the scaling factor adaptation circuit includes a multiplier circuit operable to multiply an unscaled filter tap by the scaling factor to yield the filter tap, and where the scaling factor adaptation circuit is operable to calculate a variance in the derivative of the noise filtered output to yield a calculated variance, and to receive a desired variance.

17. The data storage device of claim 16, wherein the scaling factor adaptation circuit includes a multiplier circuit operable to multiply an unscaled filter tap by the scaling factor to yield the filter tap.

18. The data storage device of claim 17, wherein the scaling factor adaptation circuit is operable to calculate a variance in the derivative of the noise filtered output to yield a calculated variance, and to receive a desired variance.

19. The data storage device of claim 16, wherein the scaling factor adaptation circuit includes:
   a multiplier circuit operable to multiply the noise filtered output by the scaling factor to yield a scaled noise filtered output; and
   wherein the scaling factor adaptation circuit is operable to calculate a variance in the derivative of the noise filtered output to yield a calculated variance, and to calculate the scaling factor based upon a ratio of the calculated variance and a desired variance; and wherein the scaling factor adaptation circuit calculates the scaling factor in accordance with the following equation:

$$\text{Scaling Factor} = \sqrt{\frac{\text{Desired Variance}}{\text{Calculated Variance}}}.$$

20. data storage device of claim 16, wherein the data processing circuit further includes:
   an edge mean calculation circuit operable to calculate an edge mean value based on the derivative of the noise filtered output; and
   a summation circuit operable to sum a derivative of the edge mean value with the noise filtered output to yield the derivative of the noise filtered output.

\* \* \* \* \*